United States Patent [19]

McMurtry et al.

[11] Patent Number: 4,892,407
[45] Date of Patent: Jan. 9, 1990

[54] OPTICAL MEASURING APPARATUS FOR USE ON MACHINES

[75] Inventors: David R. McMurtry, Wotton-under-Edge; Raymond J. Chaney, Berkeley, both of United Kingdom

[73] Assignee: Renishaw plc, United Kingdom

[21] Appl. No.: 159,592

[22] PCT Filed: Jul. 3, 1987

[86] PCT No.: PCT/GB87/00470
§ 371 Date: Mar. 1, 1988
§ 102(e) Date: Mar. 1, 1988

[87] PCT Pub. No.: WO88/00327
PCT Pub. Date: Jan. 14, 1988

[30] Foreign Application Priority Data
Jul. 5, 1986 [GB] United Kingdom ............... 8616431

[51] Int. Cl.⁴ .................................. G01B 11/00
[52] U.S. Cl. ............................ 356/375; 33/1 M; 33/50 B; 356/373
[58] Field of Search ............... 356/152, 372, 373, 375; 33/1 M, 503, 504

[56] References Cited
U.S. PATENT DOCUMENTS
3,661,463 5/1972 Brainard et al. ............... 350/287 X
3,715,599 2/1973 Marcy ............................ 250/231 R
3,765,764 10/1973 Niss ..................................... 356/3
4,261,107 4/1981 Coleman et al. ............... 356/363 X
4,276,698 7/1981 Dore et al. ........................ 33/1 M X FOREIGN PATENT DOCUMENTS
2162942 2/1986 United Kingdom .

Primary Examiner—F. L. Evans
Attorney, Agent, or Firm—Oliff & Berridge

[57] ABSTRACT

Optical apparatus for use with a machine having parts movable along three mutually orthogonal axes. The apparatus uses a single laser to direct a main beam along a first one of the axes and a square deflector mounted on a movable part of the machine to direct the beam orthogonally into a second direction without any angular errors due to pitch or yaw of the square deflector. Thus only roll of the square deflector need be measured. Further square deflectors are used to deflect the beam around other axes of the machine whereby the co-ordinates of a measuring probe can be accurately checked against the machine scale readings. Various methods of measuring roll are described including generating side beams from the main beam and directing them in anti-parallel direction to the main beam onto detectors which detect the deviation of the anti-parallel beams due to roll of the square deflector.

18 Claims, 4 Drawing Sheets

OPTICAL MEASURING APPARATUS FOR USE ON MACHINES

The present invention relates to optical measuring apparatus for checking the accuracy of a machine, for example, a co-ordinate measuring machine or a machine tool.

Co-ordinate measuring machines consist of a base on which a workpiece may be mounted, a mechanical structure carrying a measuring probe, and means for producing relative movement between the base and the measuring probe in three mutually orthogonal directions whereby the measuring probe can be accurately located in all three directions known as the x, y and z directions. Scales attached to the base and the mechanical structure, and which extend in the x, y and z directions, are read by opto-electronic read heads to provide information whereby a computer can calculate the x, y and z co-ordinates of points on a workpiece positioned on the base which are sequentially contacted by the measuring probe.

Similarly machine tools require to position a cutting tool along three co-ordinate axes to perform cutting operations on a workpiece, or to position a measuring probe for measuring the workpiece after a cutting operation as part of the production process. Movements of the relatively movable machine parts are read by scales and read heads in known manner.

The accuracy of the measurements of the workpiece obtained using a measuring machine depends on how closely the readings taken by the scale read head represent the position in space of the measuring probe. The scale readings, however, take no account of relative pitching, rolling, yawing and lateral movements of the parts of the mechanical structure during said relative movement which arise due to slackness in the machine slideways, or due to physical bending and twisting of the parts of the structure. In order to minimise these pitch, roll and yaw and other movements, the machine structure has to be made relatively massive and the slideway along which the relative movements of the structure take place have to be machined extremely accurately, use being made of air bearings on the slideway to provide ease of movement between the relatively massive structures and the base.

Similar inaccuracies occur during relative movements of parts of machine tools which affect the accuracy of the cutting operations and the measurements made by a measuring probe fitted in the tool for measuring workpieces after machining.

As an alternative to the expense of building greater accuracy into such machines, increasing use is being made of optical techniques for measuring the position of the probe independently of the scale readings. By this means the errors due to pitch, roll, yaw and lateral movements in the measurements of the machine framework can be identified and eliminated by making corrections to the measurement readings in the machine software.

One example of such independent measuring apparatus is described in U.S. Pat. No. 4,261,107 in which a plurality of laser systems is provided on a machine to measure the yaw, pitch and roll components of the machine movement in addition to the x, y and z movements. This system has the problem that it requires multiple lasers and beam benders on each of the three axes to measure all of the errors.

Other examples of optical techniques for checking errors in measuring machines and machine tools are shown in U.S. Pat. Nos. 3,661,463, and 4,276,698.

U.S. Pat. No. 3,661,463 describes a system in which a single laser beam is deflected sequentially along all three axes of a machine, thus reducing the number of lasers, but this system has no capability for measuring roll, pitch or yaw of the moving parts during their movement, and thus does not correct the machine reading for these errors.

U.S. Pat. No. 4,276,698 describes a system in which although pitch, yaw and roll of the parts of a machine are acknowledged, the errors due to many of these movements are discounted as insignificant. In large machines however, these errors may not be insignificant. Also, in the described method of making optical measurements, the laser is in some cases mounted on movable parts of the machine. The measurements given by such a system however, are themselves inaccurate, because of the pitch, roll and yaw of the laser device on the movable axis, unless measurements are taken on one axis at a time.

These problems are reduced with the optical apparatus in accordance with the invention as claimed in the appended claims whereby in a machine having parts movable relatively to each other along mutually orthogonal directions, there is provided at least one square deflector positioned on one of the movable parts of the machine so that when a beam of light from a light beam generator is directed onto it along a first one of said directions, it deflects the beam into a second one of said directions, and means for measuring rolling movements of the square deflector about the axis of the light beam.

Throughout this specification the term "square deflector" is to be understood as defining an optical device which deflects a light beam travelling in a first direction through an angle (nominally a right angle) which may deviate about the axis of the incident beam due to rolling movement of the device about the same axis, but which remains at a fixed angle irrespective of pitching or yawing movements of the device about the axis of the incident beam. Devices known as 'pentacubes' or 'pentaprisms' have this property.

One advantage of the optical apparatus of the invention is that the beam generator, which is preferably a laser beam generator, may be mounted on fixed structure of the machine so that inaccuracies due to its own pitch, roll and yaw movements are eliminated.

Another advantage of the optical apparatus of the invention is that by using a square deflector on the movable part of the machine, angular deviations of the deflected light beam from the second direction due to pitch and yaw of the deflector are elimated. Thus by continuously measuring the distance of the deflector from an origin, together with the straightness of the incident beam and roll of the deflector, both the vector of the deflected beam and its point of origin in the square deflector can be accurately determined at all times during the movement of the movable member. Thus the square deflector acts as a point of origin in the second direction, of a beam, the direction of which is known with reasonable accuracy.

By providing such optical apparatus in, or parallel to, all of the orthogonal co-ordinate axes of the machine, using square deflectors to deflect incident beams from one direction into the next one, angular deflections of the beams due to pitch and yaw of the machine parts in all axes can be eliminated thus reducing the number of measurements needed, and simplifying the optical measuring apparatus.

Pitching and yawing movements of the deflector give rise to small lateral or fore and aft displacements of the deflected beam which can be of the same order of magnitude as errors in straightness of the beams and can, if desired, be taken into account by a straightness measuring device at the end of the deflected beam.

In a preferred embodiment of the invention a single laser light source generates one beam which is deflected through the square deflectors to traverse optical paths in, or parallel to, all co-ordinate directions of the machine. The beam is also split to provide other beams which are used to generate the measurements for roll and lateral deviation (straightness) of the beams traversing the optical paths. Thus in accordance with the invention the means for directing a beam onto a square deflector may in fact be a square deflector in a previous optical path.

However, where so many beam splitters are required in the optical measuring apparatus that a single laser generator would be inappropriate, additional laser generators may be provided to inject additional optical power into the optical paths. This may require additional measurements of pitch, roll and yaw of the additional light beam generators if the accuracy of the measuring apparatus so requires unless a suitable fixed structure can be found for the laser.

Some of the roll errors may be of second order importance depending on the design of the measuring machine and the accuracy required of it. Thus some of the errors may be ignored or taken into account by error mapping the movements of one or more parts of the machine. Thus by using the optical apparatus of the present invention which eliminates some of the errors, and by choosing which errors should be measured directly and which should be covered by static or dynamic error mapping, a machine measuring system can be produced which gives high accuracy with relatively less components whereby the cost and complication of the system may be reduced.

In accordance with another aspect of the invention means for measuring rolling movement of an object about an axis during movement of the object along the axis comprises means for directing a light beam along said axis, a pair of beam splitters each fixed to the object and positioned to receive a portion of the light beam and arranged to produce a pair of side beams, two reflectors each fixed to the object and positioned to receive the side beams and to reflect the side beams into directions parallel to or anti-parallel to said light beam onto detectors positioned to detect deviation of the two reflected side beams caused by rolling motion of the object about said axis.

Where high accuracy is required of the measurement, both of the two beam splitters and both of the two reflectors are preferably square deflectors.

The invention will now be more particularly described, by way of example only, with reference to the accompanying drawings in which:

FIG. 4b is a side view of the optical system S2 shown in FIG. 4a.

Figure 1:
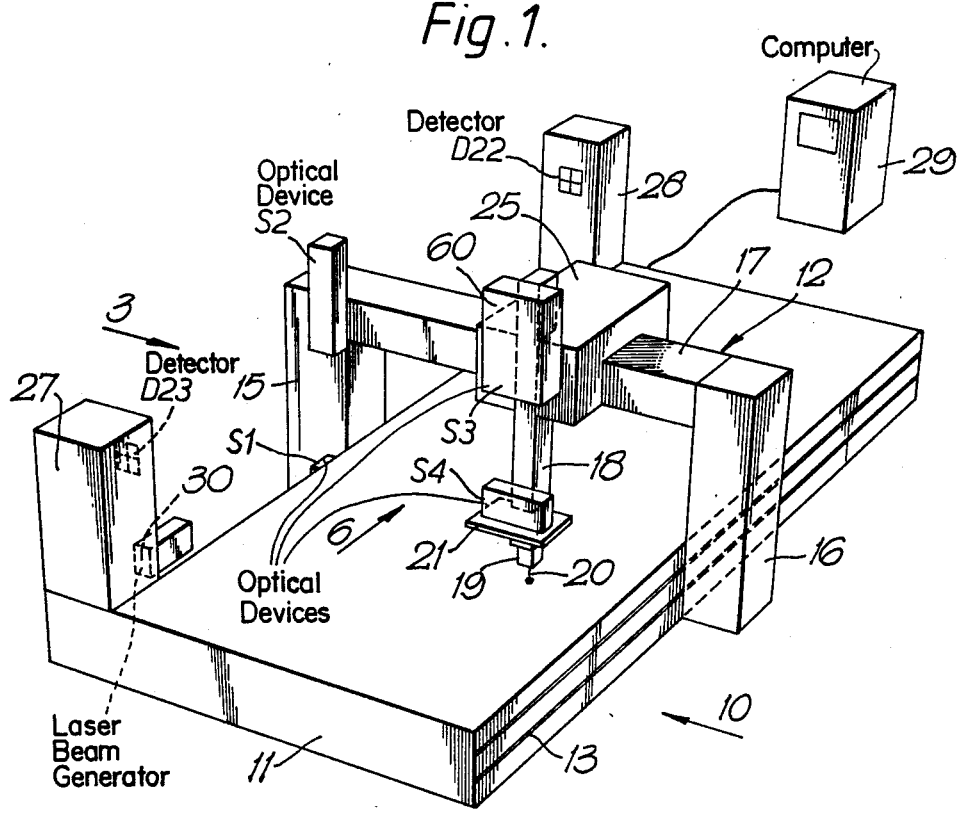
FIG. 1 is a diagrammatic view of the layout of a co-ordinate measuring machine incorporating optical measuring apparatus of the present invention.

Referring now to the drawings there is shown in FIG. 1 a co-ordinate measuring machine 10 having a base 11, a mechanical structure 12 movable of tracks 13 on the base and which extend in the y co-ordinate direction. The supports for the structure 12 on the tracks are preferably air bearings, known per se, but may be any other convenient support, for example slides or wheels, which fit closely in the tracks 13. It is to be understood that as an alternative construction the frame may be rigidly attached to earth while the base moves on the tracks.

The structure 12 consists of two pillars 15, 16 supporting a cross beam 17 extending in the x co-ordinate direction, which in turn provides a relatively rigid support for a spindle 18 which extends in the z co-ordinate direction. The spindle 18 carries a measuring head 19 having a measuring tip or probe 20 for contacting a workpiece for determining the co-ordinates of points on the surface thereof. The spindle 18 is supported by a carriage 25 in tracks (not shown) on the cross beam 17 by any convenient means, preferably air bearings, for movement along the beam to provide positioning of the spindle in the x co-ordinate direction, and the spindle 18 may be raised and lowered in conventional manner in a bearing (not shown) to provide positioning of the measuring tip or probe in the z co-ordinate direction. Hence the sum of all of the movements enables the measurement tip or probe to be located anywhere within the measuring volume of the machine. Scales (not shown) provided on the base 11, the beam 17 and the spindle 18, combined with read heads on the pillar 15 and the carriage 25 provide, in a manner known per se, readings of the positions of the relatively movable parts of the structure, and in known manner these readings are fed to a computer 29 which calculates and displays the readings as x, y and z co-ordinates of the measuring tip or probe.

The scale readings give a nominal reading of the x, y and z co-ordinates of the measuring tip 20, but due to the possibilities of each of the moving parts pitching, rolling or yawing about its axis during its movement, or being physically displaced e.g. due to slackness in the tracks, there is a degree of uncertainty about the precise positioning of the measuring tip 20. The present invention provides an optical measuring apparatus which can either give an accurate measurement of the position of the measuring tip 20 independently of the readings of the scales, or can provide error correction signals for each of the scales separately.

Figure 2:
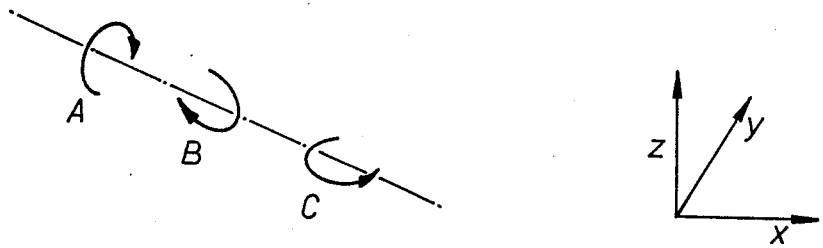
FIG. 2 is a diagram defining roll, pitch and yaw.

For the purposes of this specification the terms roll, pitch and yaw in respect of any one of the movable parts are defined with reference to FIG. 2 as follows: assuming the direction of movement is along the x axis, (i) arrow A illustrates roll which is the rotation of the part about the x axis, (ii) arrow B illustrates pitch which is the up and down motion, i.e. movement in the direction of the z axis (which is equivalent to rotation about the y axis), and, (iii) arrow C illustrates yaw which is the lateral displacement i.e. movement in the direction of the y axis (which is equivalent to rotation about the z axis).

The requirements of the apparatus are to provide a number of main optical beams extending in the direction of three principal orthogonal axes x, y and z of the machine, and measurement beams with which roll of the moving parts of the machine about those principal axes, together with straightness of the movement and the distances moved can be determined.

The optical systems may take many forms and provide the apparatus with the capability of measuring all of the deviations of the movable structure, or just those felt to produce the greatest error in the position of the stylus tip as determined by the scale readings. Also the optical systems may be the same on each axis, or may differ. For example, different considerations apply where fixed or movable structure has to be used for mounting parts of the system, e.g. the laser or detectors, or where the structure of the machine is such that on any given axes some of the deviations are so insignificant that they may be ignored.

The apparatus shown in FIG. 1 is a diagrammatic composite illustration of a machine in which the optical arrangements for different axes are deliberately chosen to illustrate different aspects of the invention which cover different possible considerations. The best solution for any given machine will however depend on whether or not the accuracy of the measurement obtained can be compromised to allow for a reduction in the number of components, or in the performance and cost of the components.

FIG. 1 depicts a laser beam generator 30 and a plurality of optical devices (S1 to S4) for receiving and directing one or more laser beams around the machine structure. A plurality of photo-diode detectors are shown positioned at various points on the machine structure to provide measurements of beam positions. For example two detectors D22, D23 are mounted on a convenient fixed structure indicated by two pillars 27 and 28 on the y axis of the machine for supporting the detectors.

The detectors are arranged to produce electrical signals from the beams impinging on them, and the electrical signals are fed to the computer 29 and may be used as correction signals to correct the scale readings to produce more accurate x, y and z co-ordinates for the probe tip 20. The detectors may be conventional split photo-diodes, i.e. a pair of photo-diodes arranged side-by-side, or, for measurements in more than one direction, a quadrature detector may be used i.e. four photo-diodes in a square configuration. Alternatively, photo-diode arrays or position-sensitive detectors (PsDs) or interferometric straightness measuring devices may be used.

The functions of the various optical devices will now be described using beam path diagrams for each of the separate axes with reference to FIGS. 3 to 7.

Figure 3B:
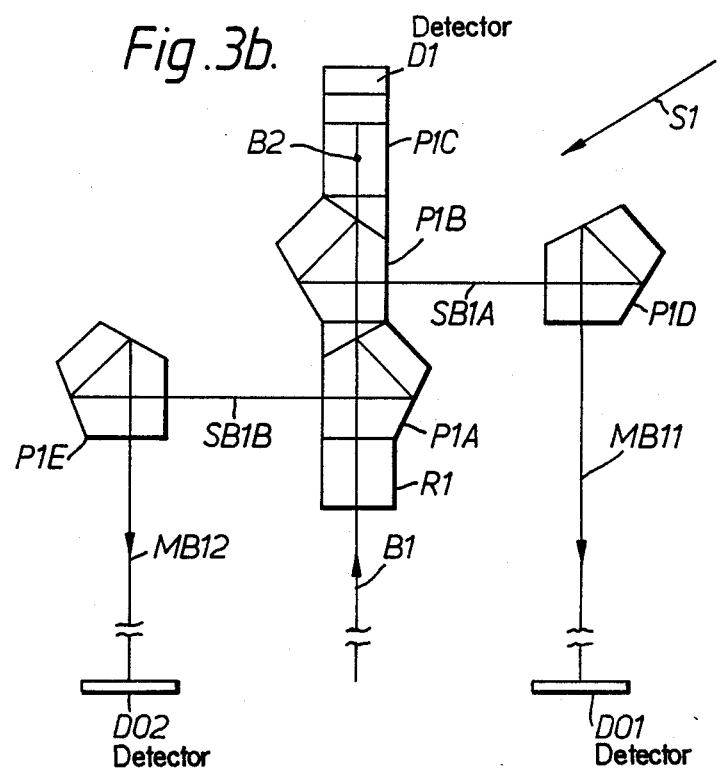
FIG. 3b is an enlarged exploded view in the x-y plane of the optical apparatus of FIG. 3a showing the optical system S1 in greater detail.
Figure 3A:
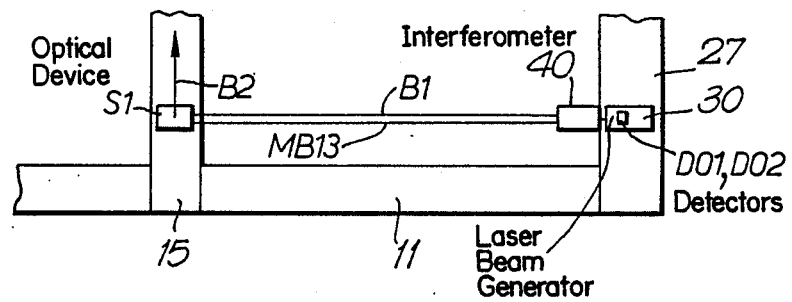
FIG. 3a is a general diagram showing the part of the optical apparatus and beam path in the y-z plane for producing measurements in the y axis.

In FIG. 3a there is shown a laser beam generator 30 mounted on pillar 27 and arranged to produce a main beam B1 of laser light which is directed in the direction of the y axis of the machine. The main beam B1 is passed through an interferometer 40 to an optical system S1 mounted on the movable pillar 15. Optical system S1 is arranged to produce a second main beam B2 at right angles to main beam B1 in the y-z plane, and targetted on an optical system S2 (FIG. 4) also on pillar 15.

In FIG. 3b it can be seen that optical system S1 has several optical devices in axial succession along beam B1 consisting of a retro-reflector R1, three pentacubes P1A, P1B and P1C and a photo-diode detector D1. All of the optical devices have on their rear reflecting facets as required, prisms which provide beam splitting surfaces for splitting beam B1 to provide both the main beam B2 (from pentacube P1C), and the required number of side beams (from pentacubes P1A and P1B) to perform the measuring function.

Two side beams SB1A and SB1B are directed from pentacubes P1A and P1B respectively onto further pentacubes P1D and P1E. These pentacubes in turn produce measuring beams MB11 and MB12 respectively directed back in anti-parallelism to beam B1 to detectors DO1 and DO2 respectively mounted on the pillar 27 to determine the roll of the optical system S1 about the beam B1.

The retro-reflector R1 produces a further measuring beam MB13 (FIG. 3a) which is also directed back in anti-parallelism to bean B1, and below it, to the interferometer 40 mounted on pillar 27. Using the interference between beam MB13 and a reference beam generated from beam B1 in the interferometer, the distance of the retro-reflector R1 from the interferometer may be accurately measured. Thus the distance of the origin of beam B2 in pentacube P1C can be calculated since in practice the retro-reflector and all of the pentacubes in optical system S1 are rigidly connected together.

A photo-diode quadrature detector D1 is provided at the end of the optical system to measure the straightness of the movement of pillar 15. Optical system S1 thus gives very accurate information about the position of the origin of beam B2 and deflects it into the direction z without transmitting any of the angular errors arising due to pitch and yaw of the optical system S1 as the pillar 15 moves. Thus the vector of beam B2 is known to a least first order accuracy.

If it becomes necessary to reduce the number of beams split from beam B1 and to reduce the number of optical components, the retro-reflector and interferometer may be deleted and a further pentacube or beam splitter may be put into the optical device S1 to direct a beam towards the read head (or an extension thereof) to impinge on a photo-diode on the read head thus giving a comparison of the actual position of beam B2 with the reading of the scale produced by the read head.

As an alternative to the above described method of measuring roll of optical system S1 deviation of the beam B2 from the vertical may be measured by an electronic inclinometer (known per se) attached to system S1 whereby the photo-diode detectors (DO1 and DO2) may be eliminated.

Figure 4A:
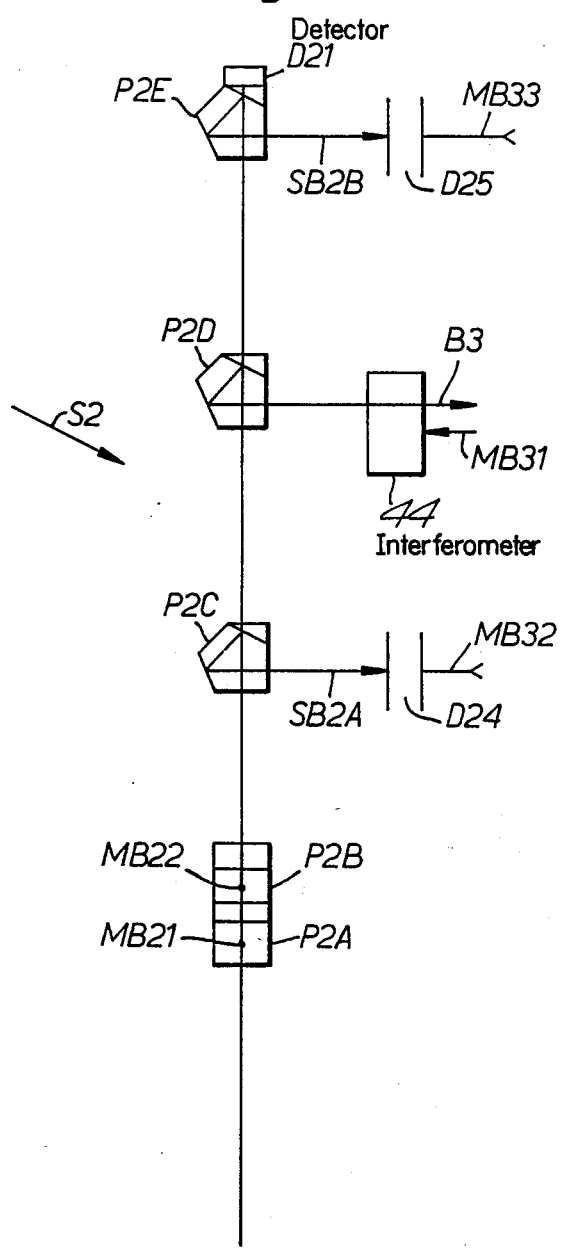
FIG. 4a is an exploded view in the x-z plane of the apparatus showing the optical devices comprising the optical system S2 in greater detail.
Figure 4B:
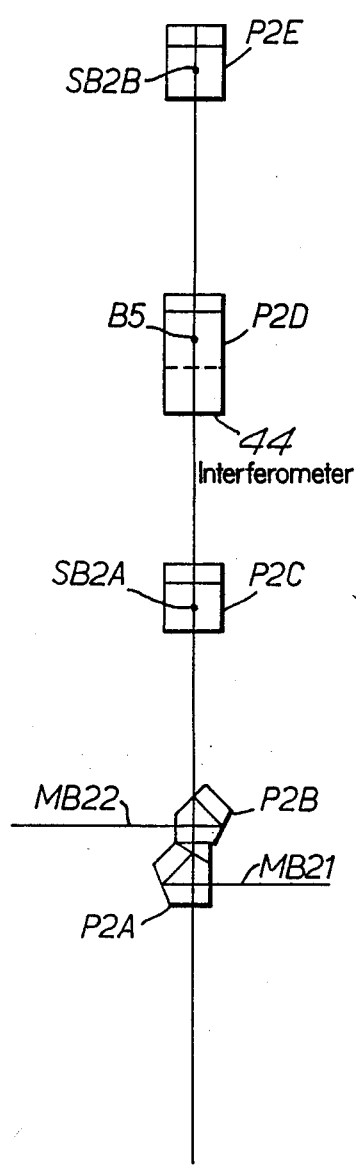

Optical system S2, which can be seen in exploded form in FIGS. 4a and 4b, is arranged on top of the pillar 15 so as to be able to direct a beam along the x-axis to the spindle 18. The system includes in axial succession along main beam B2 five pentacubes P2A, P2B, P2C, P2D and P2E, which have on their rear reflecting facets as required, prisms to provide beam splitting surfaces both for the production of the main beam B5 for the next axis, and the various measuring beams.

A photo-diode quadrature detector D21 is connected to pentacube P2E. This detector receives the main beam B2 and detects any straightness deviation (i.e. x and y lateral translation) of the beam which may be caused for example by pitch or yaw of the pillar 15.

Since the direction of main beam B2 is known from optical system S1 other than for such relatively second order lateral deviations, the identification of the straightness errors now defines the direction of main beam B2 completely. Since the systems S1 and S2 are rigidly connected to the pillar 15 the distance between pentacubes P1C and P2D and hence the position of P2D can be pre-determined very accurately.

It can be seen that pentacube P2A and P2B produce two measuring beams MB21 and MB22 which are orthogonal to beam B2 and directed in opposite directions towards detectors D22 and D23. These beams will move respectively in opposite directions into and out of the y-z plane (i.e. in the x direction) if the pillar 15 twists, thus producing roll of optical system S2 with respect to optical system S1. Any such movement will be detected by the two detectors D22 and D23, and calculation of the algebraic difference of the two detectors readings in the x direction will provide a measure of the roll of optical system S2 relative to optical system S1 about the axis of beam B2. Pentacube P2D produces a main beam B3 directed in the direction x towards the optical system S3. Use of a pentacube ensures that angular errors due to pitch and yaw of optical system S2 about main beam B2 are eliminated. Thus the only error required to be measured to define the vector of main beam B3 is the roll of system S2 about the axis beam B2. As described above, this is determined from detectors D22 and D23.

Thus the origin of the vector of main beam B3 and its direction along the x-direction can now be accurately defined because even second order straightness errors in beam B3 due to pitch and yaw of system S2 can be determined from detector D21.

The above description of systems S1 and S2 shows a possible measurement system when the detectors D22 and D23 can be placed on fixed structure. This is only practical when there are no major translational movements transverse to the line joining the optical systems and the detectors, otherwise the detectors would have to be at least as long as the movements.

Considering the problems of measuring roll of the next system S3 about the axis of the main beam B3 (i.e. the x-axis) it can be seen that any beams generated which are anti-parallel to main beam B3 for such roll measurement can only be directed to detectors supported on the top of pillar 15. Alternatively since pillar 15 has a fixed relationship with pillar 16, beams may be generated which are parallel to the beam B3 and directed at detectors supported on the top of pillar 16. Since pillar 15 or 16 may undergo pitching, rolling and yawing movements relative to optical system S3 there will be a degree of uncertainty as to whether the signals produced by the detectors are due to these movements or to roll of the system S3 which is what is required to be measured.

To increase the degree of certainty pentacubes P2C and P2E are provided to produce side beams SB2A and SB2B directed at the rear faces of two double sided split photo-diode detectors D24 and D25 to provide a datum against which the anti-parallel beams MB32 and MB33 (see also FIG. 5) can be compared (see below).

Although side beams SB2A and SB2B are shown having considerable length it must be borne in mind that in practice in the example described above all of the optical devices shown will be rigidly fixed together and the lengths of beams SB2A and SB2B will be short. Thus although pentacubes have been illustrated for producing the side beams, thus eliminating angular errors in these side beams due to any pitch and yaw movements of pentacubes P2C and P2E of the optical system S2, in practice these movements will result in negligible displacements of these side beam on detectors D24 and D25 so that simple beam splitters could replace pentacubes P2C and P2E.

Finally, as part of optical system S2 an interferometer 44 is included in the path of main beam B3 so that the distance between the pentacube P2D and the optical system can be measured.

Figure 5:
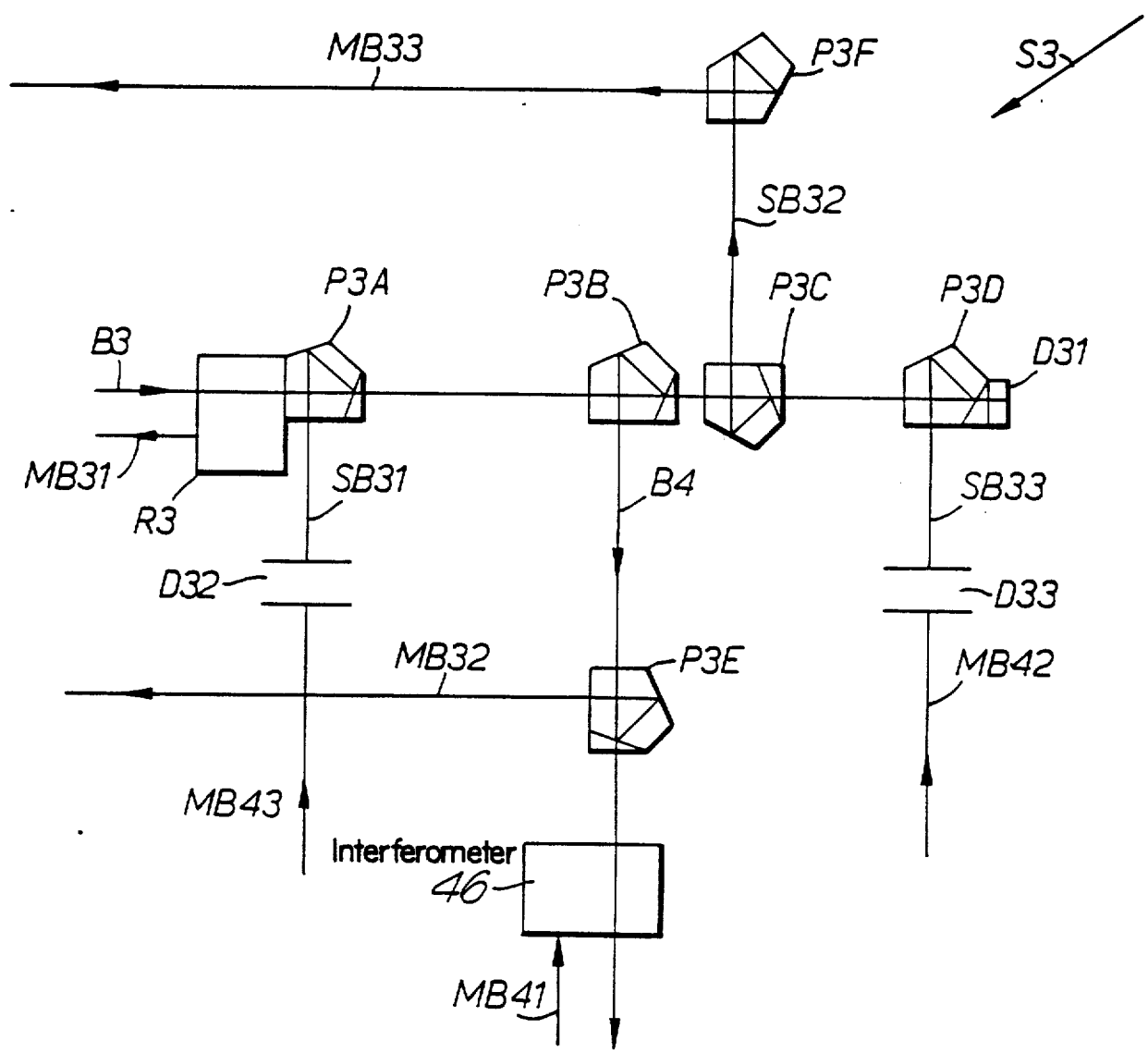
FIG. 5 is an exploded view in the y-z plane of the optical devices comprising optical system S3.

Turning now to FIG. 5 it can be seen that optical system S3 has several optical devices in axial succession along the axis of beam B3, consisting of a retro-reflector R3 and four pentacubes P3A, P3B, P3C and P3D, with a photo-diode quadrature detector D31 attached to the final pentacube P3D.

All of the optical devices have on their rear reflecting facets as required, prisms to provide beam splitting surfaces for producing both the next main beam B4 (from pentacube P3B) and the required side and measuring beams. The functions of the optical devices are:

Retro-reflector R3 returns a portion of main beam B3 as measuring beam MB31 back in anti-parallelism to main beam B3 to the interferometer 44 of optical system S2 to measure the distance of the retro-reflector from optical system S2.

Pentacube P3A produces a side beam SB31 which is directed to the rear face of a photo-diode detector D32. This beam is used as a datum against which a measuring beam MB43 from optical system S4 is compared because in the same manner as in described with reference to optical system S2, there is a degree of uncertainty about the position of the detector due to pitching, rolling and yawing movement of the optical system S3 on which it is mounted. Pentacube P3B produces main beam B4 directed along the z axis alongside the spindle 18 and through a further pentacube P3E. By use of a pentacube pitch and yaw movements of the optical system S3 due to carriage movements in the direction of main beam B3 do not provide any angular error in the direction of main beam B4 which, will remain orthogonal to main beam B3 in the z axis. Thus measurement of roll of the optical system is all that is needed to determine the vector of main beam B4, apart from straightness errors.

Pentacube P3E provides a measuring beam MB32 directed back in anti-parallelism to main beam B3 to the front face of detector D24 in optical system S2.

Pentacube P3C produces side beam SB32 which is directed at a further pentacube P3F, which in like manner to pentacube P3E, produces a measuring beam MB33 which is directed in anti-parallelism to the main beam B3 to the front face of the detector D25 of optical system S2. The difference in the readings of any movement of the measuring beams MB32 and MB33 on the front faces of the detectors D24 and D25 in the y direction compared with, and corrected by, the readings from the rear faces of the two detectors, gives an accurate measurement of roll of the optical system S3.

Pentacube P3D produces a side beam SB33 directed at the rear face of a photo-electric diode detector D33, and is used as described above in relation to detectors D24 and D25 of optical system S2 to locate the detector D33. Detector D31 measures lateral movements in the y, z directions of the carriage 25.

Thus, once again, the origin of main beam B4 is located from the distance measurement given by the interferometer 44 of system S2 and the knowledge of the vector of main beam B3, and can be corrected for roll errors as measured by detectors D24 and D25, the position of main beam B4 can be accurately calculated along its path to optical system S4.

One final component may be required in optical system S3 and that is an interferometer 46 through which main beam B4 is directed and which is arranged to receive a return measuring beam MB41 from the optical system S4 to measure the distance of optical system S4 from optical system S3.

Figure 6:
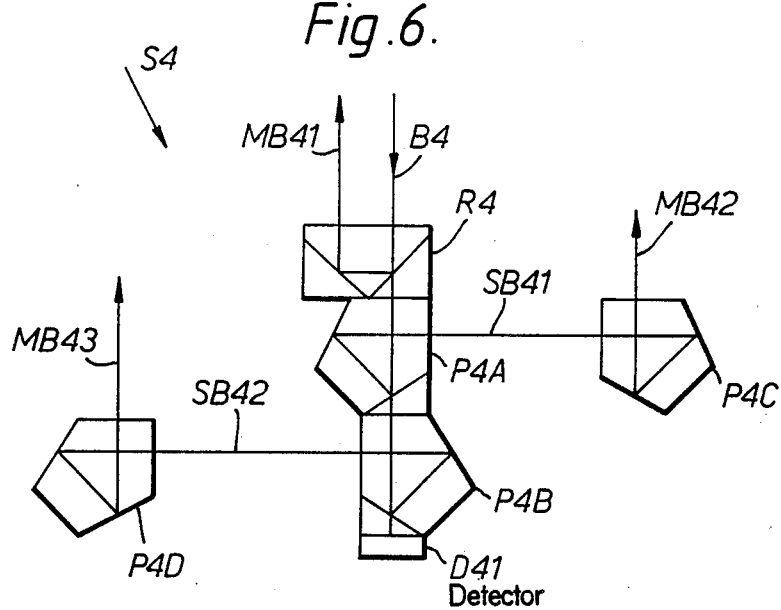
FIG. 6 is an exploded view in the y-z plane of the optical devices comprising the optical system S4.

Referring now to FIG. 6 it can be seen that optical system S4 has many of the optical devices of optical system S3 with the notable exception of a pentacube for deflecting main beam B4 into yet another orthogonal direction as clearly this is not necessary at the bottom end of the spindly 18. Optical system S4 will only be briefly described therefore.

It consists of three optical devices in axial succession along the axis of main beam B4 and provided with beam splitting surfaces from which portions of the main beam B4 are taken to provide the required side and measuring beams. The optical system includes a retro-reflector R4 which provides a return measuring beam MB41 directed at the interferometer 46 of the optical system S3, and first and second pentacubes P4A and P4B arranged to produce side beams SB41 and SB42. The side beams SB41 and SB42 are directed at further pentacubes P4C and P4D which produce two measuring beams MB42 and MB43 directed to impinge on the front faces of detectors D33 and D32 respectively to provide the measurement of the roll of the spindle 18. A photodiode quadrature detector D41 is provided attached to pentacube P4B Thus it can be seen using the invention in accordance with the first stated aspect that a laser beam can be deflected and traced around a co-ordinate measuring machine, or machine tool, by using a square reflector to deflect the beam from axis to axis and by measuring the roll of the square deflector about the axis of the incident beam. The example described above shows how this may be achieved on all axes and shows various ways in which the different problems of roll measurement may be overcome. Clearly not all axes need to be measured since the construction of some types of machines may ensure that roll on some aces is not a significant error. However, the invention will simplify the task of tracing a beam around a machine even if it is only used on one axis.

Where possible the number of beam deflections should be minimised because of the power limitations of the laser. For example, the first deflection through optical system S1 may be eliminated by mounting the laser 30 on the top of pillar 27 and measuring the roll of the optical system S2 by a method similar to that previously described for system S1 for example.

Figure 7:
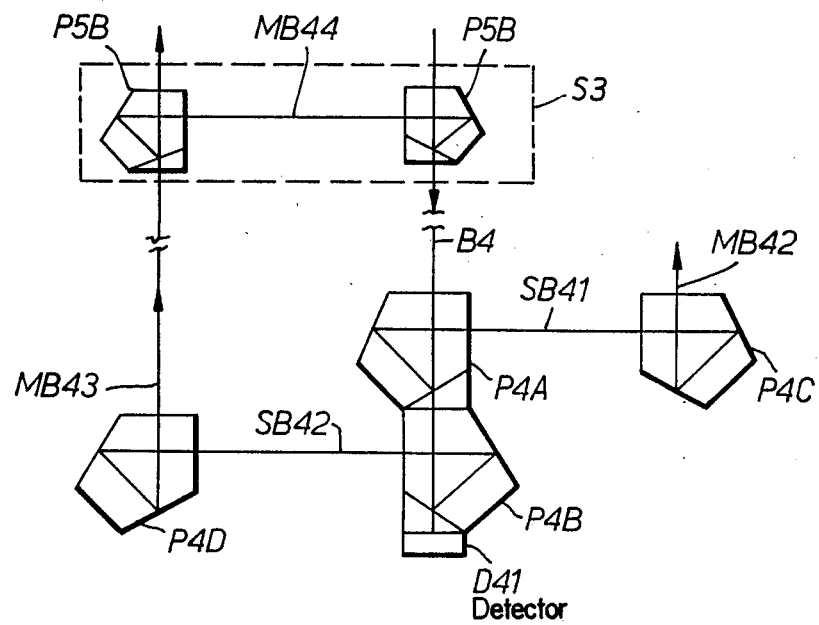
FIG. 7 is an exploded view in the y-z plane of an alternative optical system to S4.

In another modification the interferometer 46 and retro-reflector R4 could be replaced as shown in FIG. 7 by a pair of pentacubes P5A and P5B positioned respectively in beams B4 and MB43 and connected rigidly together in optical system S3 where pentacube P5A deflects a portion of the main beam B4 as a beam MB44 across at right angles to pentacube P5B establishing a reference length, and interfering beam MB44 with beam MB43 in pentacube P5B. The resulting interference pattern can be detected in a photo-diode detector mount to receive the combined interfering beam.

In the described system, the detector used for measuring roll have all been located using reference beams targetted to an additional detection mounted on the rear surface of the roll detectors. An equally valid scheme is for the reference beams and the roll measuring beams to be incident from the same direction. Such an example may occur if it was decided to mount the detectors which measure the roll of optical system S3 about B3 on top of pillar 16, rather than as an integral part of the optical system S2.

In this case (see FIG. 5) measurement beam MB32 and MB33 are now parallel to the incident beam B3. To achieve this, all that is required is to rotate pentacubes P3E and P3F through 180 degrees about beams B4 and SB32 respectively.

Although a system has been described for measuring roll using parallel on anti-parallel beams and split photodiodes, it is understood that roll can alternatively be measured interferometrically using straightness interferometers as described in U.S. Pat. No. 3,790,284, whereby each side beam for measuring roll is split into two beams. With reference to FIGS. 4 and 5 and measuring the roll of optic S3 about beam 3, the beam splitting prisms may be attached to pentacubes P3E and P3F, and the straightness reflectors correctly orientated would replace the front detectors of D24 and D25. Beams SB2A and SB2B are still required so that the straightness reflector can be located if desired for improved accuracy. In the example the displacement interferometric signal can be obtained by inserting a beam splitting surface onto pentacubes P3E and P3F and using the appropriate detector.

All of the examples described above have illustrated the use of a laser as the light beam generator which enables the use of interferometric movement techniques for length and straightness measurements. Where other means for measuring length and straightness are used, however, a collimated light beam as opposed to a coherent laser light beam may be used.

Other modifications are also possible. Although FIG. 3b shows the beam B1, MB11 and MB12 to be all coplanar, it will be appreciated that this need not necessarily be the case. There is no need for beam B1 to be co-planar with beams MB11 and MB12. Also it is shown in the figure that MB11 and B12 are anti-parallel to beam B1. Provided, the detectors can be properly located, there is no reason why beams MB11 and MB12 cannot be parallel to beam B1, or one parallel and the other anti-parallel. Similar considerations apply in optical systems S2, S3 and S4.

Furthermore, the pentacubes P1A, P1B could if desired be replaced by simple beam splitters, and P1D and P1E could be replaced by simple reflectors, if pitch errors are negligible. Also, the reason for having a pair of beam splitters P1A, P1B, a pair of reflectors P1D, P1E and a pair of detectors DO1, DO2, is to counteract the effects of pitch, yaw and straightness errors. If some or all of these are negligible, then it is possible to build a satisfactory system with only one appropriately mounted beam splitter, reflector and detector. Again, similar considerations apply in optical systems S2, S3 and S4.

We claim:

1. Optical measuring apparatus for use on a machine having a first part movable along a first axis and supported on a second part movable along a second axis orthogonal to the first axis, the apparatus comprising in combination:

means for directing a collimated light beam towards the second machine part in a direction substantially parallel to the second axis, a square deflector mountable on the second machine part in the path of the collimated light beam and for deflecting at least a portion of said light beam to produce a deflected beam directed substantially parallel to the first axis measuring beam generating means mountable on the first machine part, for receiving the deflected light beam from the square deflector and for producing therefrom at least one measuring beam, and, detector means including at least one first detector positionable in the path of a said measuring beam in an orientation such as to produce a signal indicative of transverse displacement of the measuring beam caused by rolling movement of the first machine part about the first axis.

2. Optical measuring apparatus as claimed in claim 1 and wherein the square deflector is a pentacube or pentaprism.

3. Optical apparatus as claimed in claim 1 and wherein the means for directing a collimated light beam towards the second machine part is a laser beam generator.

4. Optical apparatus as claimed in claim 1 and wherein the means for directing a collimated light beam towards the second machine part is a further square deflector.

5. Optical apparatus as claimed in claim 1 and wherein the measuring beam generating means produces two measuring beams.

6. Optical apparatus as claimed in claim 1 and wherein the measuring beam generating means comprises a first optical device for producing a side beam and a second optical device for receiving the side beam and for deflecting it into a direction substantially parallel to said first axis, the detector means being positionable on the second machine part for receiving the deflected side beam.

7. Optical apparatus as claimed in claim 6 and wherein the first optical device is a square deflector.

8. Optical apparatus as claimed in claim 6 and wherein both the first and second optical devices are square deflectors.

9. Optical apparatus as claimed in claim 6 and wherein further means are provided mountable on the second machine part in the path of the collimated light beam for producing one or more further side beams directed towards the first machine part, said detector means including at least one further detector rigidly connected respectively to the or each first detector and positional be such that the or each further side beam impinges on a further detector to provide therefrom a signal indicative of transverse displacement of the detector relative to the collimated light beam.

10. Optical apparatus as claimed in claim 9 and wherein said further means comprise at least one square deflector.

11. Optical apparatus as claimed in claim 9 and wherein said further means produce two further side beams.

12. Optical apparatus for measuring rolling movement of a first part of a machine about an axis, said rolling movement being caused by movement of the first machine part relative to a second part of the machine along said axis, the apparatus comprising in combination:

means mountable on the second machine part for directing a collimated light beam substantially parallel to said axis towards the first machine part, means mountable on the first machine part for receiving the collimated light beam and for producing therefrom at least one side beam, means mountable on the first machine part for deflecting the or each side beam to produce a respective measuring beam or beams directed towards the second part of the machine in a direction substantially parallel to said axis, and detector means mountable on the second part of the machine for receiving said measuring beam or beams and oriented to produce a signal indicative of displacement of the measuring beam or beams transverse to said axis and caused by rolling movement of the first part of the machine about said axis.

13. Optical apparatus as claimed in claim 12 and wherein the means for producing the or each side beam comprises at least one square deflector.

14. Optical apparatus as claimed in claim 12 and wherein the means for producing said at least one side beam produces two side beams.

15. Optical apparatus as claimed in claim 12 and wherein the means for deflecting the or each side beam comprises at least one square deflector.

16. A method of measuring rolling movement of a first machine part about a first axis along which it is movable relative to a second machine part wherein the first machine part is supported on the second part which is itself movable along a second axis orthogonal to the first axis, comprising the steps of:

directing a collimated light beam towards the second machine part in a direction substantially parallel to the second axis, positioning a square deflector on the second machine part in a manner such that it can receive at least a portion of the collimated light beam and deflect it towards the first machine part in a direction substantially parallel to the first axis, receiving the deflected portion of the collimated light beam on an optical device on the first machine part and producing therefrom at least one measuring beam, positioning detector means including at least one first detector in the path of the or each measuring beam in such a manner as to produce a signal indicative of transverse displacement of the measuring beam caused by rolling movement of the first machine part about the first axis.

17. The method as claimed in claim 16 and comprising the further steps of:

providing on the detector means at least one further detector respectively rigidly connected to the or each first detector, positioning the detector means on the second machine part, producing from the collimated light beam at least one further side beam directed towards the first machine part and impinging on one of the further detectors to provide therefrom a signal indicative of transverse displacement of the detector means relative to the collimated light beam, and directing the or each measuring beam from the optical device on the first machine part to impinge on a respective one of the first detectors.

18. A method of measuring rolling movement of a first machine part about an axis of the machine caused by movement of the first machine part relative to a second machine part along said axis, the method comprising the steps of:

directing a collimated light beam along said axis towards the first machine part from directing means mounted on the second machine part, receiving the collimated light beam on the first machine part and generating therefrom at least one side beam, deflecting the or each side beam by means of a deflector mounted on the first machine part to produce a respective measuring beam or beams directed towards the second machine part in a direction substantially parallel to the axis, receiving the or each measuring beam on a detector mounted on the second machine part and positioned to produce therefrom a signal indicative of displacement of the measuring beam or beams transverse to said axis and caused by rolling movement of the first part of the machine about said axis.

* * * * *

UNITED STATES PATENT AND TRADEMARK OFFICE
CERTIFICATE OF CORRECTION

PATENT NO. : 4,892,407
DATED : January 9, 1990
INVENTOR(S) : David R. McMurtry et al It is certified that error appears in the above-identified patent and that said Letters Patent is hereby corrected as shown below:

<u>IN THE DRAWINGS</u>:

The attached drawing sheet depicting Fig. 5 should be added to the four drawing sheets depicting Figs. 1-4, 6 and 7 in the patent.

Column 4, line 17, change "of" to --on--.

Column 5, line 59, change "PsDs" to --PSDs--.

Column 9, line 52, change "aces" to --axes--.

Column 10, line 4, change "mount" to --mounted--;

line 6, change "detector" to --detectors--;

line 8, change "detection" to --detector--, and change "targetted" to --targeted--;

line 16, change "beam" to --beams--;

UNITED STATES PATENT AND TRADEMARK OFFICE
CERTIFICATE OF CORRECTION

PATENT NO. : 4,892,407

DATED : January 9, 1990

INVENTOR(S) : David R. McMurtry et al.

It is certified that error appears in the above-identified patent and that said Letters Patent is hereby corrected as shown below:

Column 10, line 22, change "on " to --or--.

Signed and Sealed this

Twenty-sixth Day of November, 1991

Attest:

HARRY F. MANBECK, JR.

Attesting Officer

Commissioner of Patents and Trademarks